Patented Jan. 9, 1951

2,537,834

UNITED STATES PATENT OFFICE 2,537,834

SUBSTITUTED GUANYLMELAMINES

Donald W. Kaiser, Riverside, and Bryan C. Redmon, Stamford, Conn., assignors to American Cyanamid Company, New York, N. Y., a corporation of Maine No Drawing. Application September 26, 1946, Serial No. 699,583

13 Claims. (Cl. 260—249.6)

1

The present invention relates to guanylmelamines and a process of preparing the same comprising reacting cyanomelamine with a member of the group consisting of ammonia, primary and secondary amines and the acid addition salts thereof in a water-miscible, hydroxylated organic solvent.

An object of the present invention is to provide new and novel guanylmelamines comprising the following structure:

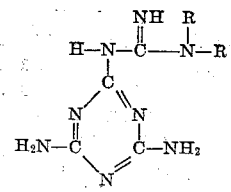

where the R's are selected from the group consisting of hydrogen, aromatic, aliphatic, alicyclic, aralkyl, and heterocyclic radicals. Such a guanylmelamine may be provided either in the form of an acid addition salt or as a free base.

Another object of the present invention is to provide a method whereby such guanylmelamines may be prepared.

Other objects will be apparent from the discussion that follows.

It has now been found that cynaomelamine which has the following formula

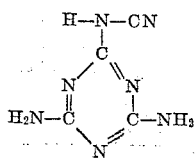

may be reacted with ammonia or a primary or secondary amine or the acid addition salts thereof to yield a guanylmelamine. The reaction between cyanomelamine and ammonia or primary or secondary amine is shown in Equation 1.

(1)

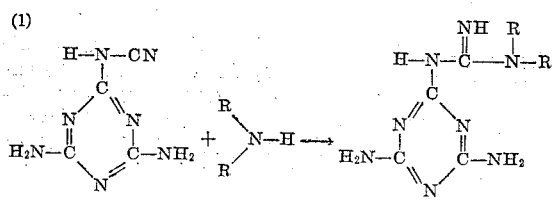

where the R's are the same as above given.

Preferably, the reaction is carried out employing an acid addition salt of ammonia or a primary or secondary amine which results in pro-

2 ducing the guanylmelamine in the form of its acid addition salt as shown in Equation 2.

(2)

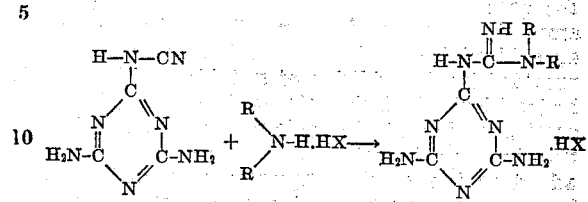

where HX is an acid molecule, and the R's are the same as above given.

If desired, the guanylmelamine may be readily obtained as the free base by isolating it in the form of the acid addition salt and neutralizing with a base such as NaOH, KOH, Ca(OH)₂, and the like, or the reaction mixture may be neutralized and the guanylmelamine obtained therefrom as the free base. Having obtained the quanylmelamine in the form of the free base, it may be readily converted to the form of other acid addition salts by treatment with the corresponding acids.

The primary and secondary amines which may be used in the preparation of the guanylmelamines may be aliphatic, aromatic, alicyclic, aralkyl, and heterocyclic and may be saturated or unsaturated. Examples of such amines which may be employed in carrying out the reaction of the present invention are as follows:

*Aliphatic amines.*—Methylamine, dimethylamines, ethylamine, β-hydroxyethylamine, diethylamine, propylamine, dipropylamine, isopropylamine, diisopropylamine, γ-methoxypropylamine, butylamine, dibutylamine, hexylamine, dihexylamine, 2-ethylhexylamine, 2,2-diethylhexylamine, octylamine, dodecylamine, octadecylamine, allylamine, β-chlorallylamine, diallylamine, octadecenylamine, ethylenediamine, propylenediamine, tetramethylenediamine, hexamethylenediamine, decamethylenediamine.

*Alicyclic amines.*—Cyclohexylamine, dicyclohexylamine, cyclopentylamine.

*Aralkyl amines.*—Benzylamine, dibenzylamine, β-phenylethylamine, naphthylmethylamine.

*Aromatic amines.*—Aniline, α-naphthylamine, β-naphthylamine, o-aminodiphenyl, sulfanilic acid, sulfanilamide, 2-sulfanilamidopyrimidine, sulfanilylguanidine, 2-sulfanilamidopyrazine, 2-sulfanilamidopyridine, 2 - sulfanilamidothiazole, aminonaphthalenesulfonic acids, aminotoluenesulfonic acids, aminophenols, aminonaphthols, toluidines, xylidines, amino-ethylbenzenes, phenylenediamines, naphthylenediamines, aminobenzoic acids, ethyl aminobenzoates, amino salicylic acids, amino-benzamides, N-ethylaniline, N-methylaniline, chloroanilines, bromoanilines, fluoroanilines, nitroanilines, anisidines, diaminophenols, diaminonaphthols, diaminodiphenylmethanes.

*Heterocyclic amines.*—Piperidine, 3-aminopyridine, morpholine, thiomorpholine, pyrrolidine, piperazine, furfurylamine, thenylamine.

The amine reactant may contain two or more substituents which may be the same or different, as, for example, in the chlorotoluidines, chloroanisidines, and the like. It is to be understood that these amines may be substituted by various organic radicals, groups, or elements which do not prohibit the reaction with cyanomelamine, numerous substituents having already been illustrated in the above list of amines and in the examples contained hereinafter.

As aforementioned, it is preferred to carry out the reaction of the present invention with the ammonia or amine substantially in the form of an acid addition salt. Such salt may be readily provided by the addition of suitable acid such as hydrochloric, hydrobromic, sulfuric, phosphoric, acetic, oxalic and like acids to the reaction mixture to form the salt in situ, or the salt may be added to the reaction mixture as such having been previously prepared by treating ammonia or amine with an acid such as one of the aforementioned acids. In selecting the acid to be employed for converting the ammonia or amine to an acid addition salt it is preferred to employ a strong mineral acid such as hydrochloric, sulfuric, phosphoric and the like, although the strong organic acids such as acetic, oxalic, formic and the like may be employed. In the case of employing aromatic amines the reaction proceeds best when such amine is substantially entirely in the form of its salt whereas with aliphatic amines it has been found preferable to provide for the presence of some free amine either by adding such amine to the reaction mixture or by adding only such an amount of acid to the reaction mixture containing the amine reactant as will not completely neutralize such amine. Since the aromatic amine salts dissociate to a much larger extent than the aliphatic amine salts, it is believed that considerable free aromatic amine is likewise present in the reaction mixture under the aforementioned preferred conditions for reacting an aromatic amine. As aforementioned, when sufficient acid or acid addition salt of amine has been employed the guanylmelamine is formed as an acid addition salt and may be isolated as such and, if desired, later converted to the free base by neutralization with suitable base, or the guanylmelamine as the free base may be isolated from the reaction mixture after neutralization thereof with suitable base such as NaOH, KOH, Ca(OH)$_2$, Ba(OH)$_2$ and the like. Having obtained the guanylmelamine as the free base, other addition salts may be readily prepared by treatment with the corresponding acid.

The selection of the solvents to be employed in carrying out the reaction of the present invention is practically entirely determined by the ability of such solvents to dissolve the cyanomelamine. Solvents capable of so dissolving this reactant are the water-miscible, hydroxylated organic solvents such as methanol, ethanol, propanol, isopropanol, butanol, phenol, glycerol, and glycols such as the ethylene, diethylene, triethylene, tetraethylene, propylene, and dipropylene glycol, and mono ethers of the glycols such as the monomethyl, -ethyl, -butyl, -phenyl, and -benzyl ethers of ethylene glycol, the monoethyl and monobutyl ethers of diethylene glycol, and the like. However, since it is preferred to carry out the reaction within the temperature range of 125°–200° C., it is best to employ such of these solvents as have a boiling point above 125° C. at atmospheric pressure since this avoids the use of an autoclave or other closed vessel. If desired, of course, the lower boiling solvents such as methanol, ethanol, isopropanol, and n-propanol may be employed providing that the reaction is carried out in an autoclave or like apparatus as aforementioned. While the reaction may be carried out at temperatures somewhat above and below the aforementioned temperature range, the use of temperatures appreciably below 125° C is distinctly disadvantageous because of the problem of effecting solution of the cyanomelamine whereas the use of temperatures decidedly above 200° C. results in decomposition of the desired guanylmelamines with the formation of melamine and other by-products. Still more preferable is the use of a temperature within the range of substantially 140°–180° C., which in turn necessitates employing a solvent having a boiling point above 140° C. at atmospheric pressure if the use of an autoclave is to be avoided.

Of the amine reactants which may be employed in the process of the present invention, those containing at least one aromatic substituent attached to the nitrogen of the amine group are preferred since the presence of such an aromatic substituent results in greater reactivity, providing the desired guanylmelamines in greater yields and in shorter periods of time. In addition, such aromatic guanylmelamines are more generally provided as compounds which may be readily crystallized and thus more easily isolated and purified.

Another preferred modification of the present invention is the preparation of an unsubstituted guanylmelamine which, as is shown in Example 8, is readily obtained in good yield, and since the method of the present invention affords a cheaper and more convenient means for obtaining this compound than has been available heretofore.

An example of the preparation of cyanomelamine is shown below:

EXAMPLE 1

*Cyanomelamine*

After dissolving 5.0 grams of 85% KOH in 225 ml. of methyl "Cellosolve" (ethylene glycol monomethyl ether), 48.0 grams of sodium dicyanimide and 50.4 grams of dicyandiamide are added and the stirred mixture refluxed at 130° C. for two and one-half hours. Water is then added to the hot solution which is then filtered to remove extraneous matter and the colorless filtrate is acidified with acetic acid to precipitate the cyanomelamine. The product is filtered off and after drying, amounts to 65.5 grams (85% of theoretical).

The cyanomelamine may then be reacted with ammonia or primary or secondary amines and/or the acid salts thereof to provide guanylmelamines as is shown in the examples that follow.

Example 2

ω-Phenylguanylmelamine

A stirred mixture of 75.5 grams of cyanomelamine, 78.0 grams of aniline hydrochloride and 200 ml. of ethylene glycol is heated and at 150° C. almost complete solution is obtained. The temperature is raised to 165° C. where it is held for about ten minutes and thereafter the solution is allowed to cool slightly and then poured into water. After adding charcoal and filter aid, the aqueous solution is heated to boiling, filtered, and the filtrate made alkaline with excess NaOH to precipitate the nearly colorless solid ω-phenyl guanylmelamine which is filtered, washed with water and air-dried. The yield of free ω-phenylguanylmelamine which has a melting point of 240°–242° C. is 111 grams or 91% of theory. Crystallization and decolorizing with charcoal using "Cellosolve"-water yields colorless plates which decompose at 249°–250° C.

If desired, the hydrochloride may be isolated instead of the free base by cooling the filtrate obtained after charcoaling to allow crystallization, and it may be purified by further crystillization from hot water, such purified crystals decomposing at 274°–275° C. Although an aqueous solution of the hydrochloride is neutral to pH paper, ammonia precipitates the free base, ω-phenylguanylmelamine.

Other experiments have been carried out in connection with the preparation of ω-phenylguanylmelamine showing that yields of 82.5% and 87.2% of crude hydrochloride salt melting at 265° C. may be obtained using phenol as the solvent.

EXAMPLE 3

ω-Methylphenylguanylmelamine

A mixture of 75.5 grams of cyanomelamine, 86.1 grams of methyl aniline hydrochloride and 200 ml. of ethylene glycol are stirred and heated until, at 170° C., complete solution occurs. Heating is continued for an additional five minutes, the solution is allowed to cool, and an almost solid mass of nearly colorless crystals of ω-methylphenylguanylmelamine hydrochloride separates. The crystals are slurred with a small amount of acetone, filtered and washed with additional acetone and after drying, weigh 126 grams or 85.5% of theory. The ω-phenylmethylguanylmelamine hydrochloride decomposes at 300° C. Purification of the hydrochloride from either water or methanol is difficult since the salt is very soluble in both of these solvents, but purification from a fairly large volume of 95% ethanol is more effective, the decomposition point being raised to 305° C.

EXAMPLE 4

ω-(p-Sulfoamido)-phenylguanylmelamine

After placing 75.5 grams of cyanomelamine, 122 grams of sulfonamide hydrochloride and 200 cc. of ethylene glycol in a flask, the mixture is stirred and heated. At about 150° C., complete solution occurs, the solution is heated to 170° C. and then allowed to cool. On cooling, the solution sets to a gel, water is added, the mixture heated to liquefy the gel, decolorizing charcoal and filter aid added, the solution filtered and allowed to cool. Solid begins to separate on the second cooling and the mixture when made basic with ammonium hydroxide, yields of colorless precipitate of ω-(p-sulfonamido)-phenylguanylmelamine which is filtered, and after drying, weighs 84 grams or 52.3% of theory and decomposes at 272° C. The free base is practically insoluble in hot "Cellosolve" (ethylene glycol monoethyl ether), ethylene glycol, or 50–50 aqueous mixtures of these solvents. It is soluble in hot glacial acetic acid, dilute HCl and dilute sodium hydroxide.

EXAMPLE 5

ω-Benzylguanylmelamine

A stirred mixture of 75.5 grams of cyanomelamine, 86.1 grams of benzylamine hydrochloride, 10.6 grams of benzylamine and 200 ml. of ethylene glycol is heated to 170° C. Solution is shortly effected, the whole is allowed to cool and upon the addition of ice, a semi-solid material is precipitated. The mixture is then made alkaline by the addition of alkali hydroxide and the semi-solid material is extracted with butanol. Removal of the butanol yields a residue of gummy material weighing 104 grams. This material is treated with hydrochloride acid which results in the formation of a viscous solution. After evaporation of the water, 121 grams of ω-benzylguanylmelamine hydrochloride, which is a soft solid, are obtained. Solution of the hydrochloride in a small volume of hot water and filtering provides a colorless solution which on standing deposits a small quantity of amorphous solid. This amorphous solid is removed by filtration and the filtrate made alkaline with sodium hydroxide to separate a viscous oil which is washed with water and dried. On standing, the ω-benzylguanylmelamine solidifies. It melts at about 228°–230° C.

EXAMPLE 6

ω-Cyclohexylguanylmelamine

A mixture of 45.3 grams of cyanomelamine, 40.65 grams of cyclohexylamine hydrochloride, 10.0 grams of cyclohexylamine, and 80 ml. of "Carbitol" (diethylene glycol monethyl ether) is heated to 150°–155° C. with stirring, whereupon a clear solution results. Thereafter, the solution is allowed to cool, and diluted with water to provide a gummy material. An additional quantity of this material is obtained by making the solution alkaline with ammonium hydroxide. On standing at ice temperature, the gum solidifies, the supernatant liquid is decanted, the solid is washed with water and air-dried. The impure, somewhat gummy ω-cyclohexylguanylmelamine is purified by treatment with acetone to obtain a non-gummy solid which may be readily ground to provide a free flowing powder melting at 217°–219° C.

EXAMPLE 7

ω-Dodecylguanylmelamine

A mixture of 80 ml. of ethylene glycol, 16.05 grams of ammonium chloride, and 66.15 grams of dodecyl amine is heated at 125° C. for about 15 minutes whereupon solution is effected. To this solution of dodecylamine hydrochloride which also contains free amine, is added 45.3 grams of cyanomelamine and the temperature is raised to 155°–160° C. After an hour at this temperature, almost complete solution is effected and after heating for an additional hour the reaction mixture is allowed to cool. On cooling, the ω-dodecylguanylmelamine hydrochloride sets to a gel-like paste.

EXAMPLE 8

Guanylmelamine 7.6 grams of 85% cyanomelamine, 18.6 grams of ammonium acetate and 30 ml. of ethylene glycol are admixed and heated to 130° C. with stirring for 1 hour. Thereafter, an additional 9.3 grams of ammonium acetate are added and the heating and stirring continued for an additional 30 minutes. The reaction mixture is then poured into 100 ml. of water and the aqueous mixture heated to boiling. The hot aqueous mixture is filtered to remove unreacted cyanomelamine and the filtrate is cooled whereupon a small amount of gelatinous solid is formed and removed by filtration. 35 grams of ammonium sulfate are added to the filtrate and after standing, solid guanylmelamine sulfate separates from solution. After drying, the guanylmelamine sulfate weighs 3.0 grams or 32% of theory.

Conversion of the guanylmelamine sulfate to the picrate is readily effected by dissolving the sulfate in water, treating with picric acid and allowing the picrate to crystallize. The picrate melts at 258°–260° C.

EXAMPLE 9

ω-(2,5-dichlorophenyl) guanylmelamine 138 grams of 89% cyanomelamine, 200 grams of 2,5-dichloraniline hydrochloride, and 320 ml. of ethylene glycol are mixed with stirring and heated to 165° C. and held at that temperature for 10 minutes. At the end of this time complete solution is effected and the reaction mixture is then poured into 1500 ml. of water containing 60 grams of NaOH. The aqueous mixture is cooled and filtered to recover the crude ω-(2,5-dichlorophenyl)-guanylmelamine. The crude material is slurried in 1500 ml. of 95% ethanol to dissolve unreacted 2,5-dichloraniline and the ω-(2,5-dichlorophenyl)-guanylmelamine is again recovered by filtration. After drying, the ω-(2,5-dichlorophenyl) guanylmelamine weighs 136.5 grams or 54.5% of theory.

The product may be further purified by converting it to the hydrochloride in aqueous solution followed by the addition of decolorizing charcoal and filter aid, and boiling. The solution is then filtered and the filtrate made alkaline by the addition of NaOH. On cooling, the alkaline solution, white crystals of ω-(2,5-dichlorophenyl)-guanylmelamine form and are filtered off. The melting point of the free base, ω-(2,5-dichlorophenyl) guanylmelamine, is 270°–270.5° C. Recovery on this purification is 71.5%.

EXAMPLE 10

ω-(p-Chlorophenyl) guanylmelamine 165 grams of 89% cyanomelamine, 200 grams of p-chloroaniline hydrochloride and 390 ml. of ethylene glycol are mixed with stirring and heated to 165° C. where the temperature is held for 10 minutes while stirring. At this time complete solution is obtained and the reaction mixture is then poured into 1500 ml. of water containing 80 grams of NaOH, cooled, and filtered. The crude ω-(p-chlorophenyl) guanylmelamine is slurried in 1500 ml. of 95% ethanol to dissolve unreacted p-chloraniline and the ω-(p-chlorophenyl) guanylmelamine is recovered by filtration. After drying, the ω-(p-chlorophenyl) guanylmelamine weighs 226.0 grams or 83% of theory.

The ω-(p-chlorophenyl) guanylmelamine is purified as in Example 9 by conversion to the hydrochloride in aqueous solution and treatment with decolorizing charcoal, boiling and filtering. The filtrate is then made alkaline by the addition of excess NaOH and cooled to provide white crystals of ω-(p-chlorophenyl) guanylmelamine which has a melting point of 260°–261° C. The recovery on this method of purification is 80%.

EXAMPLE 11

ω-(n-Butyl) guanylmelamine

A mixture of 171 grams of 89% cyanomelamine, 162 grams of n-butylamine hydrochloride and 500 ml. of ethylene glycol is heated to 165° C. and maintained at that temperature for about 1 hour. At the end of this time all the cyanomelamine has gone into solution and the reaction mixture is then cooled to about 150° C. and poured into 1 liter of water. The pH of the aqueous solution is adjusted to a pH of 6 by the addition of 5 ml. of concentrated HCl, decolorizing charcoal is added, and the solution is heated to boiling and filtered while hot. To the hot filtrate are added 400 g. of $(NH_4)_2SO_4$, and the mixture is allowed to stand overnight to deposit ω-(n-butyl) guanylmelamine sulfate. After the removal of this first crystal crop the filtrate is treated with an additional 100 grams of $(NH_4)_2SO_4$ and allowed to stand in an ice bath to deposit a second crop of the ω-(n-butyl) guanylmelamine sulfate. The two crystal crops are combined and dissolved in 600 ml. of water by heating to boiling. To the boiling solution are added 115 grams of 87.7% KOH and the solution is cooled to deposit 113 grams of crude ω-(n-butyl) guanylmelamine as the free base. This represents a yield of 50.5% of theory. The free base is purified by recrystallization from dilute KOH solution, decolorizing with charcoal, and melts at 217°–218° C.

EXAMPLE 12

ω-[m-(Trifluoromethyl) phenyl] guanylmelamine 138 grams of 89% cyanomelamine, 197.6 grams of m-(trifluoromethyl) aniline hydrochloride and 320 ml. of ethylene glycol are mixed with stirring and heated to 165° C. which temperature is maintained for 10 minutes while stirring. At this time complete solution is provided and at the end of an additional 10 minutes of heating and stirring the reaction mixture is poured into 1500 ml. of water containing 80 grams of NaOH. The aqueous mixture is cooled and the crude ω-[m-(trifluoromethyl) phenyl] guanylmelamine is removed by filtration. The crude product is slurried in 1500 ml. of 95% ethanol to dissolve unreacted m-(trifluoromethyl) aniline and the ω-[m-(trifluoromethyl) phenyl] guanylmelamine is recovered by filtration. After drying, the ω-[m-(trifluoromethyl) phenyl] guanylmelamine weighs 153.5 grams or 61.5% of theory.

The ω-[m-(trifluoromethyl) phenyl] guanylmelamine is further purified by converting it to the hydrochloride in water, adding decolorizing charcoal and filter aid, boiling, and filtering. The clear filtrate is rendered alkaline by the addition of excess NaOH and upon cooling, white crystals of ω-[m-(trifluoromethyl) phenyl] guanylmelamine are obtained which are removed by filtration. Purified ω-[m-(trifluoromethyl) phenyl] guanylmelamine melts at 253°–244° C. The recovery provided by this method of purification is 87.5%.

The guanylmelamines of the present invention are valuable chemicals being useful as flameproofing agents and as intermediates in the preparation of chemotherapeutic agents, pharmaceuticals, textile agents, dyes, rubber chemicals, plastics, ion exchange resins and the like.

While the invention has been described with particular reference to specific embodiments, it is to be understood that it is not to be limited thereto but is to be construed broadly and restricted solely by the scope of the appended claims.

What is claimed is:

1. A process of preparing a guanylmelamine of the formula

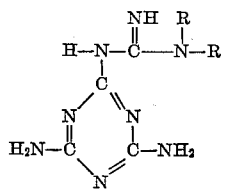

where R is a member of the group consisting of hydrogen and monovalent organic radicals comprising reacting cyanomelamine with a member of the group consisting of ammonia, primary amines, secondary amines, and the acid addition salts thereof at a temperature within the range of substantially 125°–200° C. in a water-miscible, hydroxylated organic solvent under atmospheric pressure.

2. The process according to claim 1 in which the acid addition salt is prepared in situ by the addition of acid to the reaction mixture.

3. The process according to claim 1 in which the solvent has a boiling point above substantially 125° C.

4. The process according to claim 1 in which the reaction is carried out at a temperature within the range of substantially 140°–180° C. in ethylene glycol.

5. The process according to claim 1 in which the acid addition salt is prepared in situ by the addition of acid to the reaction mixture, the reaction being carried out at a temperature within the range of substantially 140°–180° C. in ethylene glycol.

6. An aromatic guanylmelamine of the formula

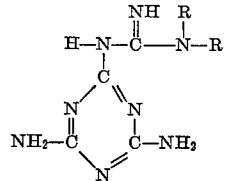

where R is an aromatic radical.

7. A process of preparing guanylmelamine having the formula

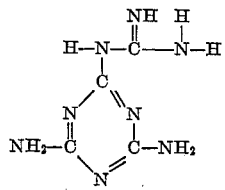

comprising reacting cyanomelamine with an acid addition salt of ammonia in a water-miscible, hydroxlated organic solvent at a temperature within the range of substantially 125°–200° C. at atmospheric pressure.

8. A process of preparing guanylmelamine comprising reacting cyanomelamine with ammonium acetate in ethylene glycol at a temperature of substantially 130° C.

9. Guanylmelamine of the formula

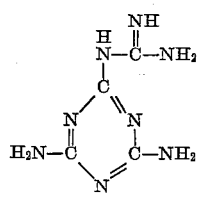

10. A process of preparing an ω-methylphenyl-guanylmelamine of the formula

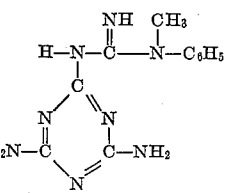

comprising reacting cyanomelamine with N-methyl aniline hydrochloride at a temperature within the range of substantially 140°–180° C. in ethylene glycol.

11. An ω-methylphenylguanylmelamine of the formula

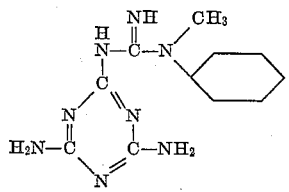

12. A process of preparing an ω-(p-chlorophenyl) guanylmelamine of the formula

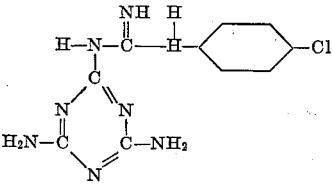

comprising reacting cyanomelamine with p-chloroaniline hydrochloride at a temperature within the range of substantially 140°–180° C. in ethylene glycol.

13. An ω-(p-chlorophenyl) guanylmelamine of the formula

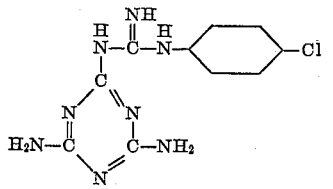

DONALD W. KAISER.
BRYAN C. REDMON.

REFERENCES CITED

The following references are of record in the file of this patent:

UNITED STATES PATENTS

| Number | Name | Date |
| --- | --- | --- |
| 1,795,738 | Schotte | Mar. 10, 1931 |
| 2,206,603 | Foster | July 2, 1940 |
| 2,394,042 | D'Alelio | Feb. 5, 1946 |
| 2,425,341 | Paden | Aug. 12, 1947 |

OTHER REFERENCES

Haag: Annalen der Chemie und Pharmacie, vol. 122 pp. 27 and 28.

Richer: Organic Chemistry, vol. III, 1946, page 96 (Aromatic Volume).

Certificate of Correction

Patent No. 2,537,834 January 9, 1951

DONALD W. KAISER ET AL.

It is hereby certified that error appears in the printed specification of the above numbered patent requiring correction as follows:

Column 6, line 21, for the word "hydrochloride" read *hydrochloric*; column 8, line 64, for ")trifluoromethyl)"; read *(trifluoromethyl)*; line 67, for "253°" read *243°*; column 10, lines 36 and 37, for that portion of the formula reading $$\overset{\text{``H''}}{\underset{\text{H}-}{|}} \quad \text{read} \quad \overset{\text{H}}{\underset{\text{N}-}{|}}$$

and that the said Letters Patent should be read as corrected above, so that the same may conform to the record of the case in the Patent Office.

Signed and sealed this 13th day of March, A. D. 1951.

[SEAL]

THOMAS F. MURPHY,
*Assistant Commissioner of Patents.*